United States Patent [19]
Turcotte et al.

[11] Patent Number: 5,678,179
[45] Date of Patent: Oct. 14, 1997

[54] MESSAGE TRANSMISSION SYSTEM AND METHOD FOR A RADIOCOMMUNICATION SYSTEM

[75] Inventors: Joseph Eric Turcotte, Montreal, Canada; Michael D. Fehnel, Fuquay-Varina, N.C.

[73] Assignee: Telefonaktiebolaget LM Ericsson, Stockholm, Sweden

[21] Appl. No.: 478,737

[22] Filed: Jun. 7, 1995

Related U.S. Application Data

[60] Division of Ser. No. 331,952, Oct. 31, 1994, which is a continuation-in-part of Ser. No. 147,254, Nov. 1, 1993, Pat. No. 5,603,081.

[51] Int. Cl.⁶ .................................................. H04Q 7/22
[52] U.S. Cl. .................... 455/331; 379/59; 340/825.44; 395/188.01
[58] Field of Search ...................... 370/95.1, 95.3, 370/110.1, 310, 321; 455/88, 89, 33.1; 340/825.44, 825.34, 825.31, 825.47, 825.48; 379/58, 59, 60; 235/389.5, 389; 395/186, 188.01

[56] References Cited

U.S. PATENT DOCUMENTS

| | | | |
|---|---|---|---|
| 4,788,543 | 11/1988 | Rubin | 340/825.44 |
| 5,010,547 | 4/1991 | Johnson et al. | 370/94.1 |
| 5,146,217 | 9/1992 | Holmes et al. | 340/825.44 |
| 5,153,903 | 10/1992 | Eastmond et al. | 379/57 |
| 5,162,790 | 11/1992 | Jasinski | 340/825.44 |
| 5,235,598 | 8/1993 | Sasuta | 370/110.1 |
| 5,353,332 | 10/1994 | Raith | 379/59 |

FOREIGN PATENT DOCUMENTS

| | | |
|---|---|---|
| 70992/94 | 2/1995 | Australia. |
| 341609 | 11/1989 | European Pat. Off.. |
| WO85/05240 | 11/1985 | WIPO. |
| WO91/03137 | 3/1991 | WIPO. |
| WO94/17501 | 8/1994 | WIPO. |

OTHER PUBLICATIONS

Australian Examination Report re AU Appln. No. 81313/94 Date of mailing: 13 Jan. 1997.
*Supplementary European Search Report*, EP 95 90 0510 Date of completion of search: 26 Oct. 1995.
European Standard Search Report; Date of completion of search: 25 Oct. 1995.
M. Heintz M. et al., "*Der Short Message Service—ein neuer Dienst der digtalen Mobilkommunikation*", ITG–Fachbericht 124, Mobile Kommunikation, Vorträge der ITG–Fachtagung Vom. 27. BIS 29. pp. 517–526 (Sep. 1993).
F. Courau et al., "*Implementation of Broadcast and Personal Messsage Services in an Experimental Mobile Radio System*", International Conference on Digital Land Mobile Radio Communications, pp. 144–151 (30 Jun. 1987—3 Jul. 1987).
M. Mouly et al., *The GSM System for Mobile Communications*, pp. 556–565 (1992).
"*A New Standard for North American Digital Cellular*", Magnus Isaksson et al., Ericsson Review, No. 2, pp. 58–69 (1994).
"*Cellular System Dual–Mode Mobile Station—Base Station Compatibility Standard*", EIA/TIA Interim Standard, IS–54–B, pp. 101–106; 109–116; 139–140; and 163–166 (Apr., 1992).
"*Internetworking With TCP/IP*", vol. I: Principles, Protocols, and Architecture, Second Edition, Douglas E. Comer, 1991, pp. 92, 93, 99 & Fig. 7.3.
PCT International Search Report regarding PCT/US94/12614; Date of mailing: 14 Mar. 1994.

*Primary Examiner*—Douglas W. Olms
*Assistant Examiner*—Ajit Patel
*Attorney, Agent, or Firm*—Burns, Doane, Swecker & Mathis, L.L.P.

[57] ABSTRACT

A method and system for message signalling in a radiocommunication system are disclosed. Privacy and urgency indicators and subaddressing can be provided to segregate messages in a hierarchical manner. User acknowledgment and reply functionality is incorporated.

12 Claims, 9 Drawing Sheets

FIG. 2(a)

| INFORMATION ELEMENT | TYPE | LENGTH (OCTETS) |
|---|---|---|
| MESSAGE TYPE | M | 1 |
| R-TRANSACTION IDENTIFIER | M | 1 |
| R-DATA UNIT | M | 2-241 |
| MESSAGE CENTER ADDRESS | O | 2-12 |

FIG. 2(b)

| INFORMATION ELEMENT | TYPE | LENGTH (BITS) |
|---|---|---|
| MESSAGE TYPE | M | 8 |
| R-TRANSACTION IDENTIFIER | M | 8 |
| | | TOTAL = 16 |

FIG. 2(c)

| INFORMATION ELEMENT | TYPE | LENGTH (BITS) |
|---|---|---|
| MESSAGE TYPE | M | 8 |
| R-TRANSACTION IDENTIFIER | M | 8 |
| R-CAUSE | M | 8 |
| | | TOTAL = 24 |

FIG. 3(a)

| INFORMATION ELEMENT | DIRECTION | TYPE | LENGTH |
|---|---|---|---|
| MESSAGE TYPE INDICATOR (MTI) | B → MS | M | 3 BITS |
| REPLY OPTION (RO) | B → MS | M | 1 BIT |
| URGENCY INDICATOR (UI) | B → MS | M | 2 BITS |
| PRIVACY INDICATOR (PI) | B → MS | M | 2 BITS |
| MESSAGE REFERENCE | B → MS | M | 6 OR 13 BITS |
| USER DATA UNIT | B → MS | M | 2 - *OCTETS |
| USER ORIGINATING ADDRESS | B → MS | O | 2 - *OCTETS |
| USER ORIGINATING SUBADDRESS | B → MS | O | 2 - *OCTETS |
| MESSAGE CENTER TIME STAMP | B → MS | O | 8 OCTETS |

FIG. 3(b)

| INFORMATION ELEMENT | REFERENCE | DIRECTION | TYPE | LENGTH |
|---|---|---|---|---|
| MESSAGE TYPE INDICATOR (MTI) | | MS → B | M | 3 BITS |
| RESPONSE CODE (RC) | | MS → B | M | 4 BITS |
| MESSAGE REFERENCE | | MS → B | M | 6 OR 13 BITS |
| USER DATA UNIT | | MS → B | M | 1 - * |
| USER DESTINATION ADDRESS | | MS → B | O | 2 - *OCTETS |
| USER DESTINATION SUBADDRESS | | MS → B | O | 2 - *OCTETS |

FIG. 3(c)

| 8 | 7 | 6 | 5 | 4 | 3 | 2 | 1 | OCTET |
|---|---|---|---|---|---|---|---|---|
| \multicolumn{8}{|c|}{BITS} | |
| \multicolumn{8}{|c|}{LENGTH INDICATOR (IN OCTETS)} | 1 |
| 0 | 0 SPARE | 0 | \multicolumn{5}{|c|}{ENCODING IDENTIFIER} | 2 |
| \multicolumn{8}{|c|}{USER DATA} | 3 |
| \multicolumn{8}{|c|}{"} | |
| \multicolumn{8}{|c|}{USER DATA} | n |

FIG. 3(d)

| Bits 8 | 7 | 6 | 5 | 4 | 3 | 2 | 1 | OCTET |
|---|---|---|---|---|---|---|---|---|
| 0 | 0 RESERVED | 0 | 0 | \multicolumn{4}{c|}{USER ORIGINATING ADDRESS 0 1 0 0 INFORMATION ELEMENT IDENTIFIER} | 1 |
| \multicolumn{8}{|c|}{LENGTH OF USER ORIGINATING ADDRESS CONTENTS} | 2 |
| ADDRESS CODING =1 | \multicolumn{3}{c|}{TYPE OF NUMBER} | \multicolumn{4}{c|}{NUMBERING PLAN IDENTIFICATION} | 3 |
| \multicolumn{8}{|c|}{1'ST ADDRESS CHARACTER} | 4 |
| \multicolumn{8}{|c|}{.} | . |
| \multicolumn{8}{|c|}{n'TH ADDRESS CHARACTER} | n |

FIG. 3(e)

| 8 | 7 | 6 | 5 | 4 | 3 | 2 | 1 | OCTET |
|---|---|---|---|---|---|---|---|---|
| 0 | 0 RESERVED | 0 | 0 | \multicolumn{4}{c|}{USER ORIGINATING ADDRESS 0 0 1 1 INFORMATION ELEMENT IDENTIFIER} | 1 |
| \multicolumn{8}{|c|}{LENGTH OF USER ORIGINATING SUBADDRESS CONTENTS} | 2 |
| 0 RSVD | \multicolumn{3}{c|}{TYPE OF SUBADDRESS} | ODD/ EVEN INDICA | \multicolumn{3}{c|}{0 0 0 RESERVED} | 3 |
| \multicolumn{8}{|c|}{SUBADDRESS INFORMATION} | 4 ETC |

FIG. 3(f)

| \multicolumn{8}{c|}{BITS} | OCTET |
|---|---|---|---|---|---|---|---|---|
| 8 | 7 | 6 | 5 | 4 | 3 | 2 | 1 | |
| 0 SPARE | \multicolumn{2}{c|}{UI} | \multicolumn{2}{c|}{PI} | \multicolumn{3}{c|}{MTI} | 1 |
| 0/1 EXT | \multicolumn{6}{c|}{MESSAGE REFERENCE (MSB)} | RO | 2 |
| 1 EXT | \multicolumn{7}{c|}{MESSAGE REFERENCE (LSB)} | 2a |
| \multicolumn{8}{l|}{USER DATA UNIT} | 3 |
| \multicolumn{8}{l|}{USER DATA UNIT} | ETC |

FIG. 3(g)

| INFORMATION ELEMENT | TYPE | LENGTH | DESCRIPTION |
|---|---|---|---|
| MESSAGE TYPE INDICATOR (MTI) | M | 3 BITS | PART OF THE MANDATORY FIRST OCTET |
| REPLY OPTION (RO) | M | 1 BIT | PART OF THE MANDATORY FIRST OCTET |
| URGENCY INDICATOR (UI) | M | 2 BITS | PART OF THE MANDATORY FIRST OCTET |
| MESSAGE REFERENCE | M | 1 OCTET | MANDATORY OCTET |
| USER DATA UNIT | M | 65 OCTETS | TEXT MESSAGE |
| USER ORIGINATING ADDRESS | O | 7 OCTETS | ASSUMED TO BE 7 DIGIT NUMBER, CODED TBCD |
| USER ORIGINATING SUBADDRESS | O | 0 OCTET | NOT PRESENT |
| MESSAGE CENTER TIME STAMP | O | 0 OCTET | NOT PRESENT |
| | | TOTAL = 74 OCTETS | |

FIG. 3(h)

| INFORMATION ELEMENT | TYPE | LENGTH (OCTETS) | DESCRIPTION |
|---|---|---|---|
| MESSAGE TYPE | M | 1 | MANDATORY FIRST OCTET |
| R-TRANSACTION IDENTIFIER | M | 1 | MANDATORY SECOND OCTET |
| R-DATA UNIT | M | 76 | SMS DELIVER ENCAPSULATED WITHIN THIS IE |
| MESSAGE CENTER ORIGINATING ADDRESS | O | 0 | ASSUMED TO BE NOT PRESENT |
| | | TOTAL = 78 OCTETS | |

FIG. 4(a)

| INFORMATION ELEMENT | REFERENCE | DIRECTION | TYPE | LENGTH |
|---|---|---|---|---|
| MESSAGE TYPE INDICATOR (MTI) | | MS→B | M | 3 BITS |
| URGENCY INDICATOR (UI) | | B→MS | M | 2 BITS |
| PRIVACY INDICATOR (PI) | | B→MS | M | 2 BITS |
| MESSAGE REFERENCE | | MS→B | M | 6 OR 13 BITS |
| DELIVERY RECEIPT (DR) | | MS→B | M | 1 BIT |
| USER DESTINATION ADDRESS | | MS→B | M | 2-* OCTETS |
| USER DATA UNIT | | MS→B | M | 1-* OCTETS |
| USER DESTINATION SUBADDRESS | | MS→B | O | 2-* OCTETS |
| VALIDITY PERIOD | | MS→B | O | 2 OR 8 OCTETS |
| DEFERRED DELIVERY TIME | | MS→B | O | 2 OR 8 OCTETS |

FIG. 4(b)

| BITS | | | | | | | | OCTET |
|---|---|---|---|---|---|---|---|---|
| 8 | 7 | 6 | 5 | 4 | 3 | 2 | 1 | |
| 0 | 0 | 0 | FORMAT =0 | DEFERRED DELIVERY TIME 0  0  1  0 INFORMATION ELEMENT IDENTIFIER | | | | 1 |
| RESERVED | | | | | | | | |
| DEFERRED DELIVERY TIME - RELATIVE | | | | | | | | 2 |

FIG. 4(c)

| BITS | | | | | | | | OCTET |
|---|---|---|---|---|---|---|---|---|
| 8 | 7 | 6 | 5 | 4 | 3 | 2 | 1 | |
| 0 | 0 | 0 | FORMAT =1 | DEFERRED DELIVERY TIME 0  0  1  0 INFORMATION ELEMENT IDENTIFIER | | | | 1 |
| RESERVED | | | | | | | | |
| DEFERRED DELIVERY TIME - ABSOLUTE | | | | | | | | 2 |
| DEFERRED DELIVERY TIME - ABSOLUTE | | | | | | | | 3 |
| DEFERRED DELIVERY TIME - ABSOLUTE | | | | | | | | 4 |
| DEFERRED DELIVERY TIME - ABSOLUTE | | | | | | | | 5 |
| DEFERRED DELIVERY TIME - ABSOLUTE | | | | | | | | 6 |
| DEFERRED DELIVERY TIME - ABSOLUTE | | | | | | | | 7 |
| DEFERRED DELIVERY TIME - ABSOLUTE | | | | | | | | 8 |

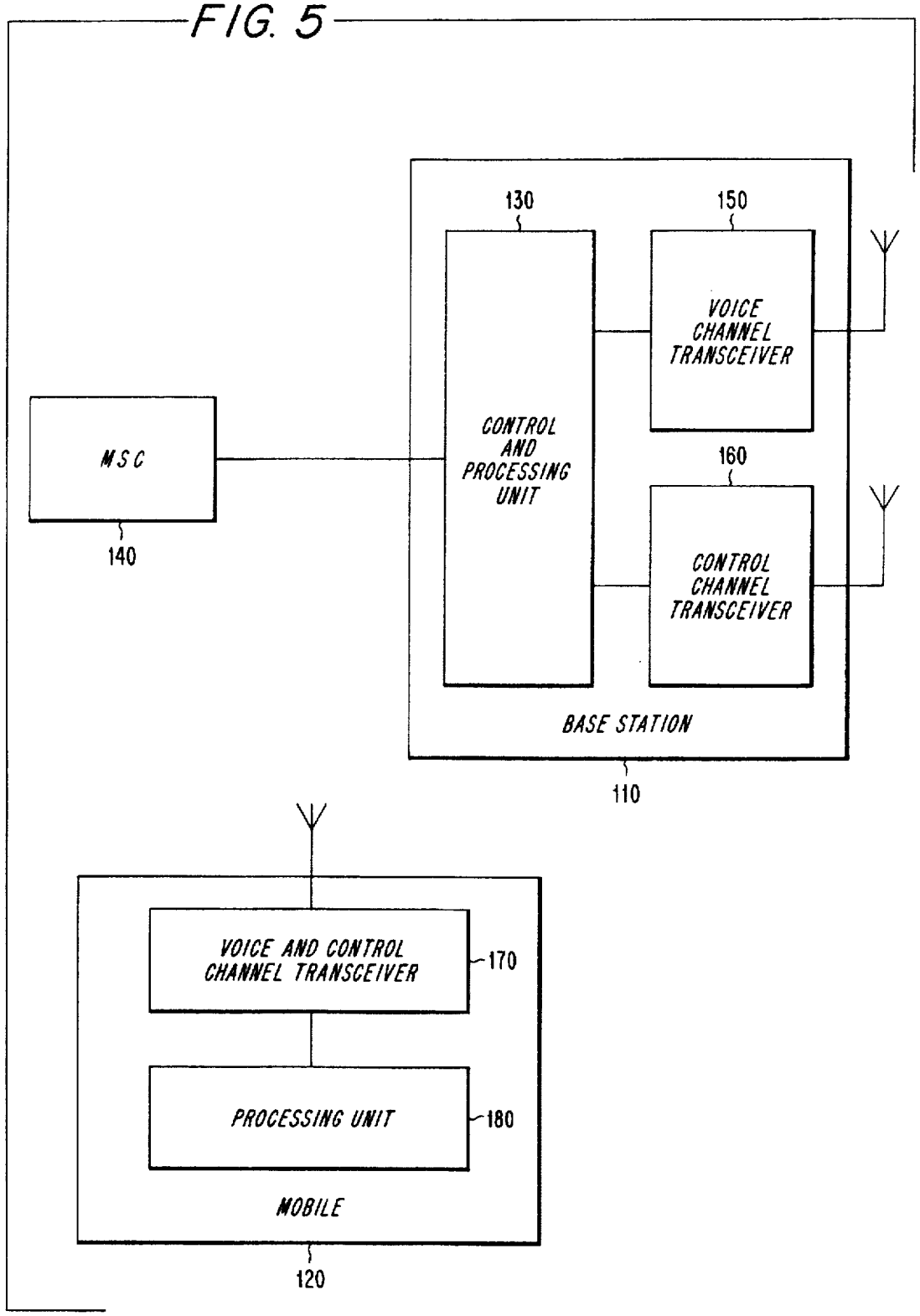

MESSAGE TRANSMISSION SYSTEM AND METHOD FOR A RADIOCOMMUNICATION SYSTEM

RELATED APPLICATION

This application is a divisional of application Ser. No. 08/331,952, filed Oct. 31, 1994 which is a continuation-in-part of U.S. patent application Ser. No. 08/147,254, filed Nov. 1, 1993, U.S. Pat. No. 5,603,081, entitled "A Method for Communicating in a Wireless Communication System" and filed on Nov. 1, 1993, which disclosure is incorporated here by reference thereto.

BACKGROUND

The present invention generally relates to radiocommunication systems and methods for signalling in radiocommunication systems and, more particularly, to systems and methods for sending messages using a digital control channel in such systems.

One radiocommunication system is described by the GSM, a European standard for radiocommunication which is intended to provide uniformity so that users can access radiocommunication systems throughout Europe with minimal equipment compatibility problems. The GSM includes specifications for many types of subscriber services, including a message function service called the Short Message Service (SMS) which provides for the transmission of messages having up to 160 alphanumeric characters to be sent to a subscriber at his or her remote unit. These messages originate, for example, from mobile units transmitting them to a service center for subsequent transmission to the designated subscriber ("mobile-originated") or from any wire-based system simply by calling an operator at the service center who types the message into the system ("mobile-terminated").

However, the short message service of GSM suffers from many drawbacks and limitations and, accordingly, has not been universally accepted or implemented in other systems, for example the North American digital radiocommunication system standardized as IS-54B.

For example, security for the short message service is almost non-existent in the GSM. Although the SMS enjoys the same authentication protection which is provided to other messages transmitted over the air interface using, for example, the mobile identification number (MIN) and/or the electronic serial number (ESN), to ensure that messages are received only by the intended remote unit, such authentication procedures provide no protection for short messages once they have been received by the intended remote unit. Thus, these messages are readily displayable, or otherwise reviewable, by any individual using the remote unit. In the event that, for example, a subscriber loans his or her remote unit to another individual, it may be undesirable for these messages to be so readily obtainable.

Other features are also lacking in the GSM message service. For example, mechanisms for delaying delivery of the message, urgency indications, user acknowledgment, sufficient addressing capability, and validity periods for delivery are not found in the GSM.

SUMMARY

These and other drawbacks and limitations of conventional radio communication systems and methods are overcome according to the present invention. According to exemplary embodiments, a field can be provided in the SMS message sent to the remote unit indicating an access level associated with that message. The user interface of the remote unit can be equipped with a mechanism for restricting access to messages depending upon the access code indicated by the field. Thus, for example, a user may need to enter an appropriate code in order to view the message.

Similarly, the signalling interface between mobile stations and the network is modified to provide for delaying delivery of the message, urgency indications, user acknowledgment, sufficient addressing capability, and validity periods for delivery.

BRIEF DESCRIPTION OF THE DRAWINGS

The foregoing objects, features and advantages of the present invention will be more readily understood upon reading the following detailed description in conjunction with the drawings in which:

FIG. 2(a) illustrates an exemplary R-DATA message format according to an exemplary embodiment of the present invention;

FIG. 2(b) illustrates an exemplary R-DATA ACCEPT message format;

FIG. 2(c) illustrates an exemplary R-DATA REJECT message format;

FIG. 3(a) illustrates an exemplary SMS DELIVER message format;

FIG. 3(b) depicts an exemplary SMS USER ACK message format;

FIG. 3(c) illustrates an exemplary user data information element message format;

FIG. 3(d) depicts an exemplary user originating address format;

FIG. 3(e) shows an exemplary user originating subaddress format;

FIG. 3(f) illustrates an exemplary bit format for the information elements shown in FIG. 3(a);

FIG. 3(g) is an exemplary SMS DELIVER message;

FIG. 3(h) is an exemplary R-DATA message encapsulating the message of FIG. 3(g);

FIG. 4(b) is an exemplary SMS SUBMIT message format;

FIG. 4(b) is an exemplary deferred delivery information element format for relative time expression;

FIG. 4(c) is an exemplary deferred delivery information element format for an absolute time expression;

FIG. 5 represents a block diagram of an exemplary cellular mobile radio telephone system.

DETAILED DESCRIPTION

In order to fully describe benefits attributable to the present invention, a first exemplary embodiment is described below using the GSM as an illustration. A second exemplary embodiment discusses the present invention in terms of the American Standard IS-54B and the digital control channel disclosed in the above-incorporated by reference application. However, those skilled in the art will readily appreciate that the present invention can be applied to message services regardless of how those services may be implemented according to any given standard.

Figure 1:
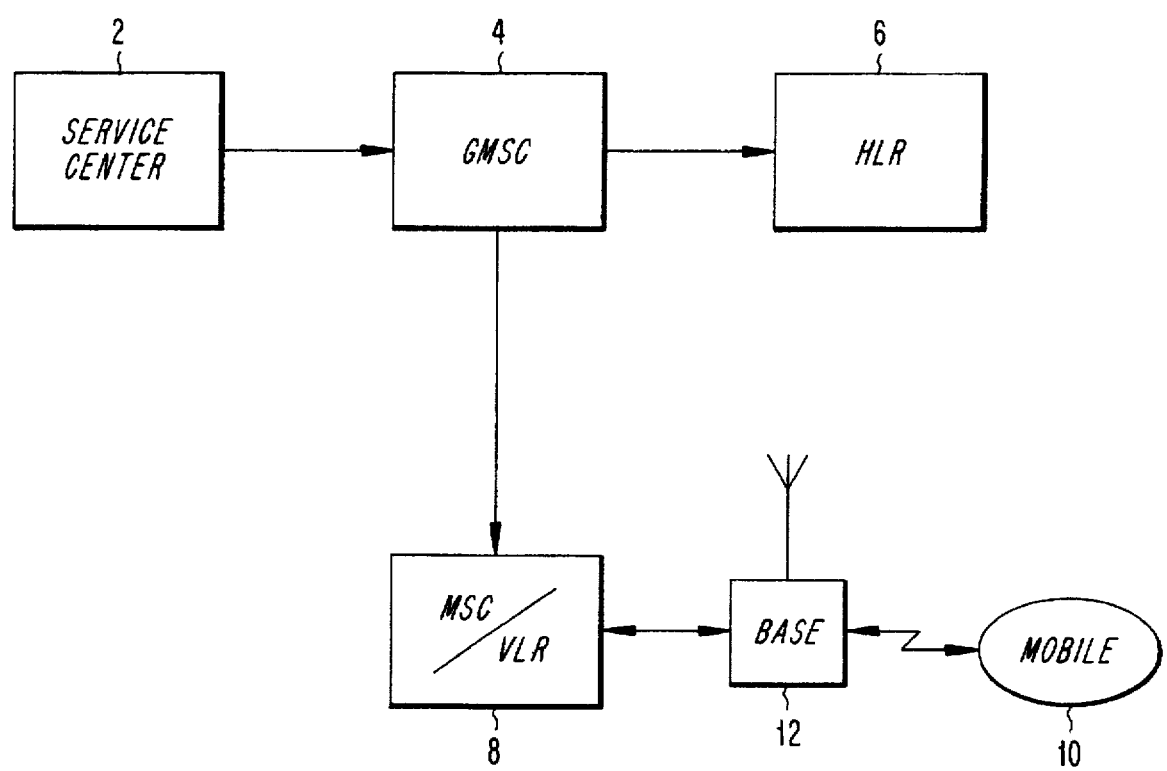
FIG. 1 is a block diagram of an exemplary system for routing messages.

When a message is delivered from a service center to a mobile unit, under the GSM specification such a message is termed a "mobile terminated short message" (MTSM). If the message also originates at a mobile unit, the signal to the service center requesting the message is termed a "mobile originated short message" (MOSM). The general process for transmitting and receiving such messages will now be described with respect to FIG. 1.

An MTSM originates after a request to service center 2, which is a node that is interfaced with a gateway mobile services switching center (GMSC) 4. The network port provided by gateway mobile services switching centers are typically further described as "interworking" when messages are being sent in the direction from the GMSC to a service center, however this additional term has been dropped to simplify the description of these centers in this document. The GMSC acts as a port into the public land mobile network. The service center stores message service profiles detailing the preferences and subscription details of each subscriber with respect to messages for each of the mobile units which it services. For example, a particular subscriber may prefer that messages be transmitted in the form of facsimiles rather than other types of media (e.g., a short message displayed at the remote terminal) or a subscriber may prefer that the messages which he or she generates be copied and stored prior to transmission.

The request to send a message to a subscriber can be transmitted to the service center 2 in many ways, e.g., by calling an operator in the service center, by facsimile message to the service center, etc. A message is then transmitted to the GMSC 4 using, for example, an interface specified in a document entitled "Technical Report, GSM 03.47", which is incorporated here by reference. The recipient remote station is identified by, for example, its MSISDN number.

Before the GMSC 4 can deliver the message through the chain of nodes to the base station 12 which is serving the recipient's remote station, the GMSC 4 first interrogates the recipient's home location register (HLR) 6 to obtain routing information for the message. The HLR 6 stores data relating to subscribers including, for example, status (connected or disconnected), current location of the subscribers' equipment, directory number (MSISDN), radio number plan identification (e.g., International Mobile Subscriber Identity (IMSI)), supplementary service profiles and teleservice profiles. To interrogate the home location register 6, a GSM MAP message called "Send Routing Information for Short Message" is sent by the GMSC 4 to the home location register 6. The appropriate home location register can be determined using the recipient's MSISDN, e.g., by translating the MSISDN into a CCITT No. 7 address.

After receiving the routing information, and if the recipient remote station is currently connected, the GMSC 4 forwards the message to the mobile services switching center (MSC) 8 which is currently serving the recipient's remote station. The MSC 8 provides an interface for switching functions and hardware control which are used when establishing a call. Note that for purposes of simplicity the visitor location register (VLR) has been illustrated in FIG. 1 as being integrated with the MSC, although in practice these two nodes can be physically separated. The VLR contains a copy of the information pertaining to a remote unit which is stored in the mobile unit's home location register when the remote unit has roamed into the service area of that VLR, the VLR being updated with information from a subscriber's home location register.

The message is then delivered to the mobile unit 10 via a base station 12 over the air interface. Acknowledgement signals are then transmitted back through the chain of nodes. If the remote unit is turned off, or not otherwise active in the system, a short message is stored at the service center 2 for later delivery. Then, when the remote system is powered up and after registration, the short message is again sent out to the remote unit where it is stored in a memory device therein.

According to an exemplary embodiment of the present invention, a privacy field can be added to the short message by the originator such that in order to output the short message from the remote unit, a user must provide an appropriate input to view the message. A more detailed example of privacy fields, and other novel message service features, will now be described with respect to an exemplary signalling system according to the present invention in which a digital control channel exists, for example, the system described in the above-identified and incorporated application.

The message service operations to be described use three bi-directional messages denoted herein as R-DATA, R-DATA ACCEPT and R-DATA REJECT. FIG. 2(a) illustrates an exemplary R-DATA message. Therein, the message type information element identifies the R-DATA message, the R-transaction identifier provides a numerical reference for the message, the R-DATA unit information element carries the SMS message and the message center address is an optional information element which can be included by the message center for mobile terminated messages. An exemplary R-DATA ACCEPT message is illustrated in FIG. 2(b). Therein, the message type information element identifies this message as an R-DATA ACCEPT message. The R-transaction identifier information element returns the same identifier as was found in the earlier R-DATA message being accepted. Similarly, an exemplary R-DATA REJECT message is illustrated in FIG. 2(c). This message is used to acknowledge and reject the R-DATA message. The exemplary message format includes a message type information element, an R-transaction identifier, and an R-Cause information element which provides information regarding the cause of the rejection. As with the aforedescribed GSM system, the operations are described in two categories: mobile-terminated messages and mobile-originated messages.

The mobile-terminated message service includes delivery of a message from the message center (e.g., an SMS DELIVER application message) to the mobile. If the mobile is "camping" on the digital control channel, i.e., isn't currently involved in a call but is powered on, the base station can page the mobile and wait to receive a page response message therefrom. Once the base has received the page response, the base sends the R-DATA message, which contains the SMS DELIVER application message, to the mobile station. The R-DATA message can also be used to send an SMS DELIVER message when a mobile station is involved in a call on a traffic channel.

An exemplary SMS DELIVER application message is illustrated in FIG. 3(a). Therein, the first column provides a title for each information element, the second column indicates that each information element in the message is being transmitted from the base station to a mobile station, the third column designates certain information elements as "mandatory" and others as "optional", and the fourth column provides an exemplary bit length for each element. Of course, those skilled in the art will appreciate that such designations are system specific and that fields designated as "mandatory" in the Figures need not be mandatory for other implementations. The function of each information element will now be described in more detail.

The message type indicator informs the mobile station that this message is an SMS DELIVER message. The next information element, entitled "Reply Option", indicates if user acknowledgment of the message is requested. For example, a binary zero for this bit can be used to indicate that user acknowledgment is not required and a binary one can be used to indicate that user acknowledgment is required. More bits could be provided to this field to add additional functionality, such as optional user acknowledgment.

User acknowledgment can be provided by sending an SMS USER ACK message from the mobile station in response to an SMS DELIVER message having the reply option set to indicate that user acknowledgment is required. An exemplary SMS USER ACK message is illustrated in FIG. 3(b). Most of the information elements depicted in FIG. 3(b) will be described subsequently with respect to other messages. However, the response code information element is used in the SMS USER ACK message to provide a response to the message originator, the values of which are system specific.

The urgency indicator is used to allow the sender of a message to provide levels of urgency thereto. For example, the mobile could use the urgency indicator to provide different types of notification to the message recipient. Other potential uses for this indicator include: storage priority or order of retrieval from memory. An exemplary usage for the bits in this information element is illustrated in the table below.

TABLE 1

| BITS | DESCRIPTION |
|------|-------------|
| 00   | Bulk        |
| 01   | Normal      |
| 10   | Urgent      |
| 11   | Very Urgent |

The privacy indicator element, described briefly above, is used to allow the sender to set a level of privacy to the message being sent. Thus, the mobile receiving an SMS DELIVER message may process the message differently based on the level of privacy appended thereto. For example, different passwords may be required to be entered by the mobile user before reading the SMS DELIVER messages based upon the code found in this field. An exemplary usage for the bits in this field is illustrated below in Table 2.

TABLE 2

| BITS | DESCRIPTION   |
|------|---------------|
| 00   | Not Restricted |
| 01   | Restricted    |
| 10   | Confidential  |
| 11   | Secret        |

Figure 6:
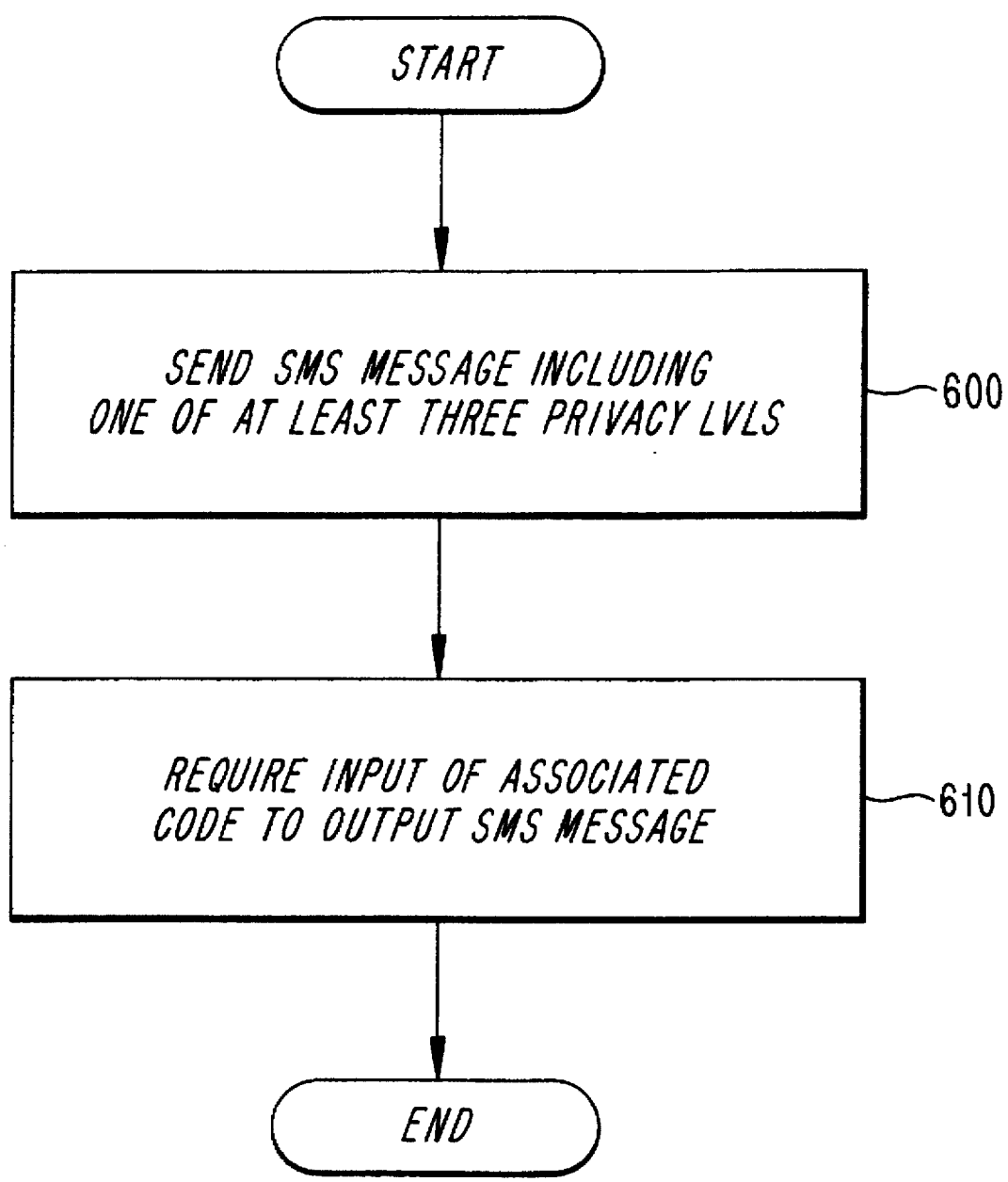
FIG. 6 is a flowchart illustrating an exemplary method for providing privacy indicators to SMS messages according to the present invention.

The above described levels of privacy can be used as illustrated in FIG. 6. Therein, at step 600, an SMS message is sent in which one of at least three levels of privacy is appended thereto. In order to output the SMS message (i.e., at the recipient's mobile station), an associated code must be input at step 610.

The message reference element provides a reference number which can be used by message originators to keep track thereof. If the value of this element is less than 64, a six bit field can be used for the message reference. If, on the other hand, the value is greater than 63, but less than 8192, a 13 bit field can be used for the message reference. In mobile terminated references, the message reference element is also used to associate a user acknowledgment message with the previously sent SMS DELIVER message to be "user acknowledged" when the reply option element is set to, for example, 1. The message reference sent in an SMS USER ACK message is the same as that received in the SMS DELIVER message.

The user data unit information element is used to carry the text of the sender's message. An exemplary format for this element is illustrated in FIG. 3(b). The user originating address may be included by the originating user or by the message center to identify the originating user of a message. An exemplary format for the user originating address information element is illustrated in FIG. 3(c). Therein, the type of number field referred to in the third octet at bits 765, can include the information described in Table 3 below.

TABLE 3

| BITS | DESCRIPTION       |
|------|-------------------|
| 000  | Unknown           |
| 001  | International #   |
| 010  | National #        |
| 011  | Network-specific # |
| 100  | Subscriber #      |
| 101  | Reserved          |
| 110  | Abbreviated #     |
| 111  | Reserved          |

The international, national and subscriber numbers are described, for example, in CCITT recommendation 1.330. A network specific number can be used to indicate administration and service numbers specific to a serving network. If the number type is one of unknown, international number, national number or subscriber number, then the numbering plan identification field further defines the number of the originating user as follows in Table 4.

TABLE 4

| BITS 4 3 2 1 | DESCRIPTION |
|--------------|-------------|
| 0000 | Unknown |
| 0001 | ISDN/telephony numbering plan (CCITT Recommendations E. 164 and E. 163) |
| 0011 | Data numbering plan (CCITT Recommendation X. 121) |
| 0100 | Telex numbering plan (CCITT Recommendation F. 69) |
| 1001 | Private numbering plan |
| 1111 | Reserved for extension |

All other values are reserved.

The address character fields of the user data unit can be coded as set forth in Table 5.

TABLE 5

| BINARY VALUE | DIGIT |
|--------------|-------|
| 0000 | Filler |
| 0001 | 1 |
| 0010 | 2 |
| 0011 | 3 |
| 0100 | 4 |
| 0101 | 5 |
| 0110 | 6 |

TABLE 5-continued

| BINARY VALUE | DIGIT |
|---|---|
| 0111 | 7 |
| 1000 | 8 |
| 1001 | 9 |
| 1010 | 0 |
| 1011 | * |
| 1100 | # |

All other values are reserved.

The user originating subaddress information element identifies the subaddress of an originating user of a message. For example, a mobile having more than one terminal connected thereto may use the originating subaddress to discriminate at which of those terminals the message originated. An exemplary format for this information element is illustrated in FIG. 3(d). Therein, the type of subaddress field found in octet 3 provides for the types illustrated below in Table 6.

TABLE 6

| BITS | DESCRIPTION |
|---|---|
| 000 | (CCITT Recommendation X.213 or ISO 8348 AD2) |
| 010 | User-specified |

All other values are reserved.

The odd/even indicator in FIG. 3(d) is used when the type of subaddress is user specified and the coding is Telephony Binary Coded Decimal (TBCD). A "0" in this field indicates that there is an even number of address signals, and a "1" in this field indicates that there are an odd number of address signals. The subaddress information, i.e., octet 4 and subsequent octets, can be encoded, for example, as described in CCITT Recommendation X.213 or ISO 8348 AD2. The message center time stamp information element provides a field wherein the message center may include a time at which the message was received by the message center.

To put these elements in perspective, an exemplary bit format for these information elements is illustrated in FIG. 3(e).

After delivering the message, the base station then starts a timer. Upon reception of the R-DATA message, the mobile station provides a layer 3 acknowledgment to the base as follows. If the R-DATA message is acceptable to the mobile, the mobile responds by sending an R-DATA ACCEPT message with the same R-Transaction Identifier present in the R-DATA message. If the R-DATA message is not acceptable to the mobile, the mobile responds by sending an R-DATA REJECT message with the same R-Transaction Identifier present in R-DATA message, and with the R-Cause information element which informs the base of the reason for rejection of the message. If the base timer expires prior to receiving a layer 3 acknowledgment, the base may re-transmit the R-DATA message.

The following is an example of some of the foregoing messages in application. Consider the following text message to be sent to a mobile station: "Votre rendez-vous de cet aprégpréss-midi est cancelle! Salut, Eric". This message is 63 characters long. An exemplary SMS DELIVER message for conveying this text message from the message center is illustrated in FIG. 3(f). The SMS DELIVER message illustrated in FIG. 3(f) is encapsulated in a layer 3 message at the message center and sent to the base station. The base station receives the layer 3 message from the message center and will then format a layer 3 R-DATA message to be delivered to the mobile station. For this particular example, the R-DATA message would be as shown in FIG. 3(g). Accordingly, a 77 octet layer 3 message will be transmitted to the mobile station over the air interface. The initial text message was 63 octets and 7 octets were added to identify the originator. Therefore, eight octets are presented as overhead.

Assuming that the mobile station has received and accepted the R-DATA message, it will then return a layer 3 R-DATA ACCEPT message as, for example, illustrated in FIG. 2(b), to the base station. This acknowledgment will be used by the base station to provide a message terminal acknowledgment to the message center. On the other hand, if the mobile station rejects the R-DATA message, then an R-DATA REJECT message will be sent to the base station as, for example, illustrated in FIG. 2(c).

Having described an exemplary process for mobile-terminated messages, an exemplary embodiment of the present invention relating to mobile-originated messages will now be described with respect to FIGS. 4(a)-4(c).

When a mobile station is camping on the digital control channel and is required to send a message, the mobile first examines the SMS access flag broadcast by the base station on the BCCH indicating the maximum message length that the mobile station is authorized to send. If the R-DATA message length is greater than the maximum message length (in octets) authorized by the base station, the mobile refrains from transmitting the R-DATA message. If the R-DATA message length is less than the maximum message length (in octets) authorized by the base station, then the mobile may send the R-DATA message, providing that the registration rules allow the mobile to access the system. Much like the foregoing exemplary embodiment for mobile-terminated messages, a message is encapsulated in the layer 3 R-DATA message. In this case, however, an SMS SUBMIT message (illustrated in FIG. 4(a)) rather than an SMS DELIVER message is encapsulated.

Many of the information elements depicted in the exemplary SMS SUBMIT message of FIG. 4(a) are identical to those found in the SMS DELIVER message described above with respect to FIG. 3(a) and, therefore, will not be further described here. However, the SMS SUBMIT message also has several different information elements which will now be described.

The delivery receipt information element is used to request the message center to provide a receipt to the originating mobile station upon delivery of the message to the destination user. For example, this field can include a binary "0" to indicate that no delivery receipt is required or a binary "1" to indicate that a delivery receipt is required.

The validity period information element is used in the mobile originated message to indicate to the message center a time after which the message can be deleted if it has not been delivered to the destination user. For example, a destination user may have his or her mobile powered off so that the message cannot be delivered by the message center. In such a situation, if the message is no longer of any value after some predetermined period of time, the validity period information element can be used to prevent the message center from wasting effort on obsolete messages.

The validity period field can be expressed in either relative or absolute terms. For example, the length of the validity period may be expressed based on the time when the SMS SUBMIT message is received by the message center rendering this a relative representation. On the other hand, the validity period can also be expressed using an absolute time for termination, for example, indicating that the message is to be terminated after 8:00 P.M. Est.

The deferred time information element provides the optional capability to allow the message center to deliver the message at a later time. As with the validity period information element, the time expression in this field can either be relative or absolute. An exemplary format for this information element using a relative expression is illustrated in FIG. 4(b) and a format using an absolute time expression is illustrated in FIG. 4(c).

When the R-DATA message is sent, the mobile starts a timer. Upon reception of the R-DATA message, the base provides a layer 3 acknowledgment to the mobile, as follows. If the R-DATA message is acceptable to the base, it responds by sending an R-DATA ACCEPT message with the same R-Transaction Identifier present in the R-DATA message to acknowledge. If the R-DATA message is not acceptable to the base, it responds by sending an R-DATA REJECT message with the same R-Transaction Identifier present in the R-DATA message to acknowledge, and with the R-Cause information element explaining the rejection. If the mobile timer expires prior to receiving a layer 3 acknowledgment, the mobile may re-transmit R-DATA.

If the mobile station is already assigned a traffic channel (e.g., the mobile is involved in a call), the mobile sends the R-DATA message to the base station by either using a FACCH or SACCH with the transmission service indicating L2 acknowledge mode. The mobile station then starts a timer. Upon reception of the R-DATA message, the base station provides a layer 3 acknowledgment to the mobile, as follows. If the R-DATA message is acceptable to the base, it responds by sending an R-DATA ACCEPT message with the same R-Transaction Identifier present in the R-DATA message to acknowledge. If the R-DATA message is not acceptable to the base station, it shall respond by sending an R-DATA REJECT message with the same R-Transaction Identifier present in the R-DATA message to acknowledge, and with the R-Cause information element. If the mobile's timer expires prior to receiving a layer 3 acknowledgment, the mobile station may re-transmit R-DATA.

The foregoing description has generally referred to, for example, mobile and base station communications without describing such stations per se. Accordingly, the following description is intended to provide an example of such mobile and base stations in general with respect to FIG. 5.

FIG. 5 represents a block diagram of an exemplary cellular mobile radiotelephone system according to one embodiment of the present invention which can be used to implement the foregoing. The system shows an exemplary base station 110 and a mobile 120. The aforedescribed message signalling between base and mobile stations can be performed using these, or other, apparatuses. The base station includes a control and processing unit 130 which is connected to the MSC 140 which in turn is connected to the public switched telephone network (not shown).

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The voice channel transceiver broadcasts the traffic or voice channels which can include digital control channel location information as described previously.

When the mobile 120 first enters the idle mode, it periodically scans the control channels of base stations like base station 110 to determine which cell to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate. Additional information relating to specifics of mobile and base station implementations can be found in copending U.S. patent application Ser. No. 07/967,027 entitled "Multi-Mode Signal Processing" filed on Oct. 27, 1992 to P. Dent and B. Ekelund, which disclosure is incorporated here by reference.

While the present invention has been described using the foregoing exemplary embodiments, these embodiments are intended to be illustrative in all respects, rather than restrictive of the present invention. For example, although the phrase "remote device" has been used throughout this specification, the present invention can be applied to systems and methods wherein any type of remote equipment which supports the message service is originating or receiving the message, e.g., PCS equipment, a portable unit, a personal digital assistant, a data terminal, etc.

Moreover, although the foregoing exemplary embodiments refer to messages which originate at "mobiles", those skilled in the art will also recognize that the present invention can also be applied where other types of equipment originate the message, e.g., PSTNs or data networks. Further, although the present invention has been exemplified by embodiments which refer to the GSM, the present invention is equally applicable to any system or standard (e.g., PDC or ADC) wherein messages may be routed using methods or systems that include service centers or analogous equipment. Thus, the scope of the present invention is instead set forth by the appended claims and encompasses any and all equivalents and modifications embraced thereby.

What is claimed is:

1. A method for sending message between users in a radiocommunication network over a digital channel comprising the steps of:

sending a message from a first user at a remote station to said network via said digital channel for delivery to a second user at another remote station;

including, as part of said message, a privacy indicator that denotes a level of privacy associated with said message, said privacy indicator indicating one of at least three different levels of privacy;

providing at least three different codes, one each associated with a respective one of said at least three levels of privacy;

transmitting said message to said second user at said another remote station; and requiring said code associated with said level of privacy indicated by said privacy indicator to be input by said second user prior to outputting said message at said another remote station.

2. The method of claim 1, wherein said digital channel is a digital control channel.

3. The method of claim 1, wherein said digital channel is a digital traffic channel.

4. The method of claim 1, wherein said step of including further comprises the step of:

provoding a multi-bit privacy indicator field in said message, different bit combinations of said field being indicative of different levels of privacy including messages which are: not restricted, restricted, confidential or secret.

5. A mobile station comprising:

a receiver for receiving a text message via a digital channel over an air interface, said text message including a privacy indicator field identifying one of at least three different levels of privacy associated with said text message; and a processor for processing said received text message including said privacy indicator field and requiring an input code associated with said one of said at least three different levels of privacy prior to outputting said text message, wherein a different input code is associated with each of said at least three different levels of privacy.

6. The mobile station of claim 5, wherein said digital channel is a digital control channel.

7. The mobile station of claim 5, wherein said digital channel is a digital traffic channel.

8. The mobile station of claim 5, wherein said privacy indicator field is a multi-bit field wherein different bit combinations of said field are indicative of different levels of privacy including text messages which are: not restricted, restricted, confidential or secret.

9. A mobile station comprising:

a transmitter for transmitting a text message via a digital channel over an air interface; and a processor for appending a privacy indicator to said text message wherein said privacy indicator denotes one of at least three different levels of privacy associated with said text message, each of which requires a different password to access said text message.

10. The mobile station of claim 9, wherein said digital channel is a digital control channel.

11. The mobile station of claim 9, wherein said digital channel is a digital traffic channel.

12. The mobile station of claim 9, wherein said privacy indicator is a multi-bit field wherein different bit combinations of said field are indicative of different levels of privacy including text messages which are: not restricted, restricted, confidential or secret.

* * * * *